(12) United States Patent
Katsumata et al.

(10) Patent No.: US 7,486,947 B2
(45) Date of Patent: Feb. 3, 2009

(54) MOBILE COMMUNICATION DEVICE AND POSITION SEARCH METHOD

(75) Inventors: Hiroyuki Katsumata, Sapporo (JP); Hayato Sasaki, Sapporo (JP); Kazuyuki Sato, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/166,155

(22) Filed: Jun. 27, 2005

(65) Prior Publication Data

US 2006/0217129 A1 Sep. 28, 2006

(30) Foreign Application Priority Data

Mar. 22, 2005 (JP) ............................... 2005-081017

(51) Int. Cl.
*H04L 12/58* (2006.01)
(52) U.S. Cl. .................................................. 455/412.1
(58) Field of Classification Search .............. 455/404.1, 455/404.2, 456.4, 551
See application file for complete search history.

(56) References Cited

U.S. PATENT DOCUMENTS

| | | | |
|---|---|---|---|
| 5,701,328 A | | 12/1997 | Schuchman et al. |
| 6,073,005 A | * | 6/2000 | Raith et al. ............. 455/404.1 |
| 6,073,013 A | * | 6/2000 | Agre et al. .................. 455/428 |
| 6,115,596 A | * | 9/2000 | Raith et al. ............. 455/404.2 |
| 6,625,457 B1 | * | 9/2003 | Raith ....................... 455/456.1 |
| 2001/0044302 A1 | | 11/2001 | Okuyama |
| 2002/0160747 A1 | | 10/2002 | Tsuchihashi |
| 2002/0193942 A1 | | 12/2002 | Odakura et al. |
| 2004/0203567 A1 | | 10/2004 | Berger |

FOREIGN PATENT DOCUMENTS

| | | |
|---|---|---|
| CN | 1383334 | 12/2002 |
| EP | 1073298 | 1/2001 |
| EP | 1 253 798 | 10/2002 |
| JP | 2000-322678 | 11/2000 |
| JP | 2000-331146 | 11/2000 |
| JP | 2001-45553 | 2/2001 |

(Continued)

OTHER PUBLICATIONS

European Search Report, dated Sep. 27, 2005, for related EP 05 25 3978.

(Continued)

*Primary Examiner*—Vincent P. Harper
*Assistant Examiner*—Gary Au
(74) *Attorney, Agent, or Firm*—Staas & Halsey LLP

(57) ABSTRACT

A mobile communication device capable of issuing a report as quickly as possible to a report destination of which telephone number or electronic mail address varies depending on the current position is provided. When identification information of the report destination is inputted, the identification information is converted to a communication address such as a telephone number or electronic mail address for the report destination corresponding with the current position of the mobile communication device such as a cellular phone by means of pattern matching and call request or transmission processing is performed. In the case of a mobile communication device with a high processing performance, the current position is located by activating the GPS prior to receiving a position communication request from the report destination, and the current position is communicated on the basis of the position communication request.

10 Claims, 12 Drawing Sheets

| | FOREIGN PATENT DOCUMENTS | | |
|---|---|---|---|
| JP | 2001-218250 | 8/2001 |
| JP | 2001-320467 | 11/2001 |
| JP | 2001-339536 | 12/2001 |
| JP | 2002-269660 | 9/2002 |
| JP | 2002-357448 | 12/2002 |
| JP | 2003-284125 | 10/2003 |
| WO | WO 00/35228 | 6/2000 |
| WO | WO 03/024141 | 3/2003 |

OTHER PUBLICATIONS

European Search Report dated Dec. 28, 2005 for related European Patent Application No. 05253978.0-2412.

Chinese Patent Office Action, mailed Feb. 1, 2008 and issued in corresponding Chinese Patent Application No. 2005100847856.

* cited by examiner

FIG. 5

PATTERN MATCHING DATA

| IDENTIFICATION INFORMATION | CURRENT AREA | CONVERSION VALUE |
|---|---|---|
| 110 | AREA A | aaa@bbb.oo |
| | AREA B | ccc@ddd.oo |
| | AREA C | eee@fff.oo |
| | ⋮ | ⋮ |
| 119 | AREA A | ggg@hhh.oo |
| | AREA B | iii@jjj.oo |
| | AREA C | kkk@lll.oo |
| | ⋮ | ⋮ |
| 9876543210 | AREA A | mm@nnn.oo |
| | AREA B | ppp@qqq.oo |
| | AREA C | rrr@sss.oo |
| | ⋮ | ⋮ |

FIG. 7

PATTERN MATCHING DATA

| IDENTIFICATION INFORMATION | CURRENT AREA | CONVERSION VALUE |
|---|---|---|
| 110 | AREA A | 0312345678 |
| | AREA B | 0221234567 |
| | AREA C | 0191234567 |
| | ⋮ | ⋮ |
| 119 | AREA A | 0311112222 |
| | AREA B | 0221111222 |
| | AREA C | 0191111222 |
| | ⋮ | ⋮ |
| 9876543210 | AREA A | 0312121212 |
| | AREA B | 0221212121 |
| | AREA C | 0191212121 |
| | ⋮ | ⋮ |

MOBILE COMMUNICATION DEVICE AND POSITION SEARCH METHOD

BACKGROUND OF THE INVENTION

1. Field of the Invention

The present invention relates to a mobile communication device such as a cellular phone comprising a GPS (Global Positioning System) function and a position search method that searches the current position of the mobile communication device and, more particularly to a mobile communication device and position search method that are capable of easily and rapidly issuing information to a destination with a different emergency report telephone number or mail address depending on the region by using a pattern matching function and which are capable of rapidly communicating the current position to the destination, in the case of an emergency report.

2. Description of the Related Art

In Japan, the emergency contact telephone number for the police is 110, for example. It is possible to call the police by dialing 110 from any location within Japan irrespective of whether a fixed line phone or cellular phone is used.

Furthermore, it is also possible for a disabled person to send a report to the police by electronic mail. However, in the case of electronic mail, the contact address is different for each area (for each administrative division of Japan, for example) Therefore, in the case of a mobile communication device such as a cellular phone, it is necessary to send mail to the mail address of the police having jurisdiction over the position in accordance with the current position.

Further, in order to specify the position of the cellular phone, the police receiving an emergency report from a cellular phone by phone or email specify the position of the cellular phone that issued the emergency report by phone or electronic mail by using a so-called third-party search function for searching for the position of the cellular phone of another person by using the GPS function.

Japanese Patent Application Laid Open No. 2003-284125 discloses, in a position search control system comprising a mobile device with a constitution comprising a position detection function and an emergency button, and a center that is capable of communicating with the mobile device, a system that rejects a position search when same is not desired by the mobile device side but which enables a position search and emergency report in the event of a warning.

Japanese Patent Application Laid Open No. 2001-218250 discloses a position information supply system that, in addition to calling a mobile device, performs a search for position information on the mobile device and supplies position information on the call mobile device to a pre-designated communication destination.

Japanese Patent Application Laid Open No. 2001-320467 discloses a mobile communication device equipped with a dedicated button for issuing an emergency call.

Japanese Patent Application Laid Open No. 2001-339536 discloses a system in which a position information sensor receives emergency information that is issued by a cellular mobile device that is owned by the person that issued the emergency information and the position information center detects the position where the person that issued the emergency is located by means of a GPS function on the basis of the emergency communication information that is issued by the cellular mobile device owned by the person that issued the emergency, and then transfers the location position information on the person that issued the emergency to the emergency communication destination.

Japanese Patent Application Laid Open No. 2000-322678 discloses a cellular phone that comprises a main body with a 110 (for police in Japan) number button and a 119 (for fire station in Japan) number forming a pair which links to the police station and fire station as a result of these respective buttons being pressed and is capable to communicating the current position by means of a navigation function.

The Japanese Patent Application Laid Open No. 2002-269660 discloses an emergency report system in which, upon issuing an emergency state of affairs, the reporting party mobile device sends an emergency report mail to the center by inputting a fixed message in the title and the center acquires current position information from the mobile body network with the telephone number of the mobile body mobile device serving as the key, selects the mail address of the police mobile device of the suitable jurisdiction, adds the current position of the reporting party mobile device to the header of the mail main text from the reporting party mobile device as well as information on the individual, and transfers a warning report to the police mobile device.

Japanese Patent Application Laid Open No. 2001-045553 discloses a mobile communication device that is able to automatically register specified phone number information for the current region in which the user is located in a phone book in which telephone number information is registered such that same can be called, searches for the destination with the specified telephone from an index, and issues information to the specified telephone number.

Japanese Patent Application Laid Open No. 2000-331146 discloses an image editing device that cuts the text image from the inputted image, extracts a text code array by identifying the text image, edits the inputted image along with the text code array, and displays the editing result of the image.

Japanese Patent Application Laid Open No. 2002-357448 discloses a positioning device that displays map elements existing in a predetermined range from an acquired position as a list, displays map elements designated by the user from among regional elements displayed as a list in a display state that differs from that of other map elements on the map, and corrects the position designated by the user on the map to its own position.

However, current cellular phones (mobile communication devices) are confronted by the following problems. First, although, for an emergency report made over the telephone, the same telephone number is provided for the whole country as in the case of the emergency report telephone number (number 110) for the police, in the case of an emergency report via electronic mail, the mail address is different according to the police of the region. Therefore, although the emergency report mail address is different depending on the current position of the cellular phone, unless the user of the cellular phone is able to immediately acquire in an emergency the mail address of the police having jurisdiction over the user's own current position, there is the risk that the report will be delayed.

Secondly, in a case where the cellular phone comprises an international roaming function that makes it possible to use the cellular phone not only within Japan but also overseas, the emergency report telephone number for the police, for example, is different for each country. For example, this number is 110 in Japan but 911 in the U.S.A. Therefore, when the cellular phone is used overseas, the emergency report telephone number cannot be acquired immediately and there is the risk of a telephone emergency report being delayed. Emergency report mail addresses are also different for each country and also vary depending on the region of each country. Therefore, similarly, there is the problem that it is not possible to immediately acquire an emergency report electronic mail address.

Thirdly, upon receipt of an emergency report from a cellular phone, the police communicate the third party search request from the police to the cellular phone on the basis of the third party search function and the cellular phone accordingly starts the positioning of its own current position. However, where the current processing performance of the cellular phone is concerned, because the positioning of the current position takes time (approximately 30 seconds), there is the possibility that the positioning processing by the cellular phone will be interrupted as a result of the user consciously or unconsciously turning the power supply of the cellular phone off or the like en route, and there is the risk that the position cannot be specified.

SUMMARY OF THE INVENTION

Therefore, in view of the above problem, an object of the present invention is to provide a mobile communication device that makes it possible to easily and immediately issue an emergency report by electronic mail and an overseas emergency report (both a telephone call and an electronic mail).

In addition, a further object of the present invention is to provide a mobile communication device and position search method that implement as soon as possible specification of the current position (positioning) required in the event of an emergency report.

The constitution of the mobile communication device of the present invention for achieving the above object comprises storing means which stores identification information for a predetermined report destination and a communication address for each area of the report destination; area detection means which detects the area that contains the current position; and communication means that extracts the communication address of the report destination corresponding with the area detected by the area detection means from the storing means in response to the input of the identification information of the report destination and that communicates with the report destination by using the extracted communication address.

The mobile communication device of the present invention preferably further comprises positioning means which locates the current position by means of a GPS, wherein, upon starting communications with the report destination by using the extracted communication address, the positioning means start to locate the current position prior to receiving a position communication request from the report destination by the communication means and the communication means communicates the current position that is located by the positioning means to the report destination on the basis of receipt of the position communication request.

For example, the area detection means detects the area containing the current position on the basis of base station information received from a base station. Further, the predetermined report destination is an emergency report destination including the police, fire brigade or ambulance services, for example, and the communication address is a telephone number or electronic mail address.

A position search method of the present invention that, based on a report to a predetermined report destination from a mobile communication device that is capable of locating a current position by means of a GPS, searches for the current position of the mobile communication device from the report destination, wherein the communication device of the report destination acquires mobile device information capable of identifying the processing performance of the mobile communication device, and transmits a position communication request to the mobile communication device while communicating with the mobile communication device when it is judged that the processing performance of the mobile communication device is high on the basis of the mobile device information and transmits a position communication request to the mobile communication device following the end of communications with the mobile communication device when it is judged that the processing performance of the mobile communication device is low; and the mobile communication device communicates the current position that is obtained as a result of the GPS positioning to the communication device of the report destination on the basis of the receipt of the position communication request.

Furthermore, in the case of the above position search method, a mobile communication device with a high processing performance preferably starts GPS positioning while communicating with the communication device of the report destination; and a mobile communication device with a low processing performance starts GPS positioning on the basis of receipt of the position communication request. Further, for example, the processing performance of the mobile communication device is judged from the operating speed of a processor built in the mobile communication device.

In the case of the position search method of the present invention, the mobile communication device comprises storing means which stores identification information for a predetermined report destination and a communication address for each area for the report destination; and the mobile communication device detects the area containing the current position in response to the input of the identification information of the report destination, extracts the communication address of the report destination corresponding with the detected area from the storage means, and communicates with the communication device of the report destination by using the extracted communication address.

According to the mobile communication device of the present invention, even when the communication address such as the telephone number or electronic mail address or the like of the report destination is different depending on the position of the mobile communication device, a report can be issued to the communication address corresponding with the position of the mobile communication device by inputting predetermined identification information identifying the report destination. Even when the user does not know the telephone number of the report destination corresponding with the current position, it is possible to communicate with the report destination by inputting common identification information identifying the report destination.

Furthermore, when the processing performance of the mobile communication device is high, because the GPS position is started and the current position obtained is communicated to the report destination without waiting for receipt of a position communication request from the report destination, the current position can be communicated rapidly to the report destination.

Further, in cases where it is judged that the processing performance of the mobile communication device is high, the report destination is able to rapidly acquire the current position of the mobile communication device by transmitting a position communication request requesting communication of the current position determined by GPS positioning to the mobile communication device without waiting for the end of communications with the mobile communication device.

BRIEF DESCRIPTION OF THE DRAWINGS

FIG. 5 shows an example of pattern matching data for an emergency report electronic mail;

FIG. 7 shows an example of pattern matching data for an emergency report telephone number;

DESCRIPTION OF THE PREFERRED EMBODIMENTS

An embodiment of the present invention will be described with reference to the drawings. However, this embodiment does not limit the technological scope of the present invention.

In the case of the present invention, the emergency report fixed input information (identification information of report destination) is converted to a communication address such as the telephone number or electronic mail address for the report destination corresponding with the current position of the mobile communication device such as a cellular phone (sometimes called a 'mobile device' hereinbelow) by means of pattern matching technology.

Figure 1:
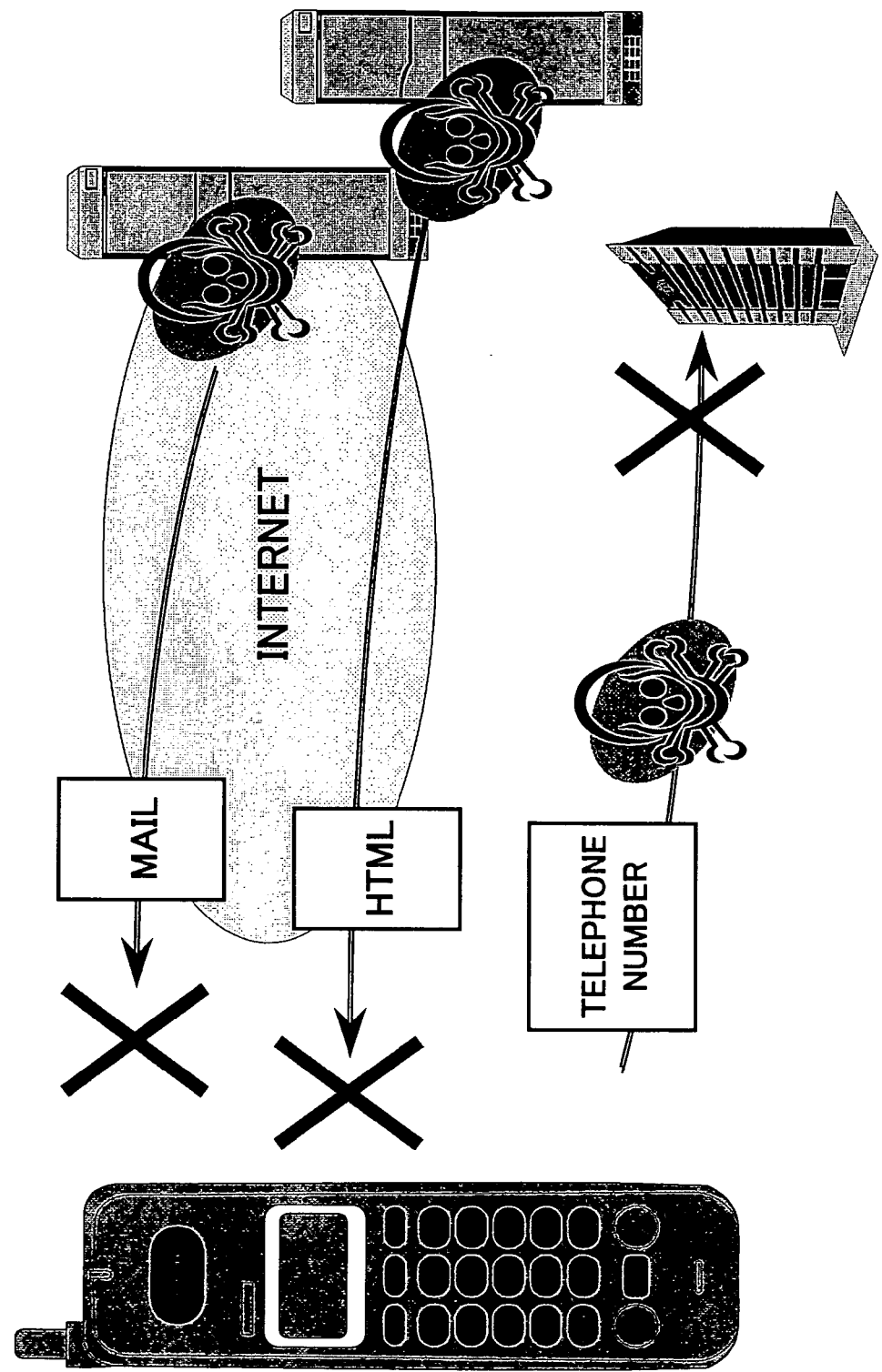
FIG. 1 illustrates an outline of a pattern matching technology.

FIG. 1 illustrates an outline of a pattern matching technology. Pattern matching technology is technology that the discovers content that is transmitted from the outside, harmful content from within an electronic mail, and electronic mail due to the telephone, mail and Internet-browsing functions and so forth of the mobile device, and protects data within the mobile device. More specifically, a list of data (definition file) of the URLs and mail addresses corresponding with the harmful content is prepared beforehand, the definition file and the URL or address of the electronic mail of the received content are compared and, in the case of a match, processing to refuse receipt of the transmitted content or the like or to delete data or the like is implemented, and the mobile device is protected. Further, so too in the case of incoming telephones, a list of data (definition file) of harmful telephone numbers is prepared and, in the case of a match, processing to reject the incoming call and so forth is implemented.

In addition, where access to a URL or electronic mail address or the like by the mobile device and call transmission are concerned, a list of data (definition file) to reject access or reject transmission is prepared and access and transmission to the destination that matches the list data are rejected. This definition file is distributed by the server on the network, for example, and is preferably updated as occasion calls or at regular intervals.

In the case of this embodiment, the pattern matching technology mentioned earlier is used and a specified telephone number and mail address are converted to the telephone number and electronic mail address corresponding with the current position in accordance with the current position of the mobile device, for example.

Figure 2:
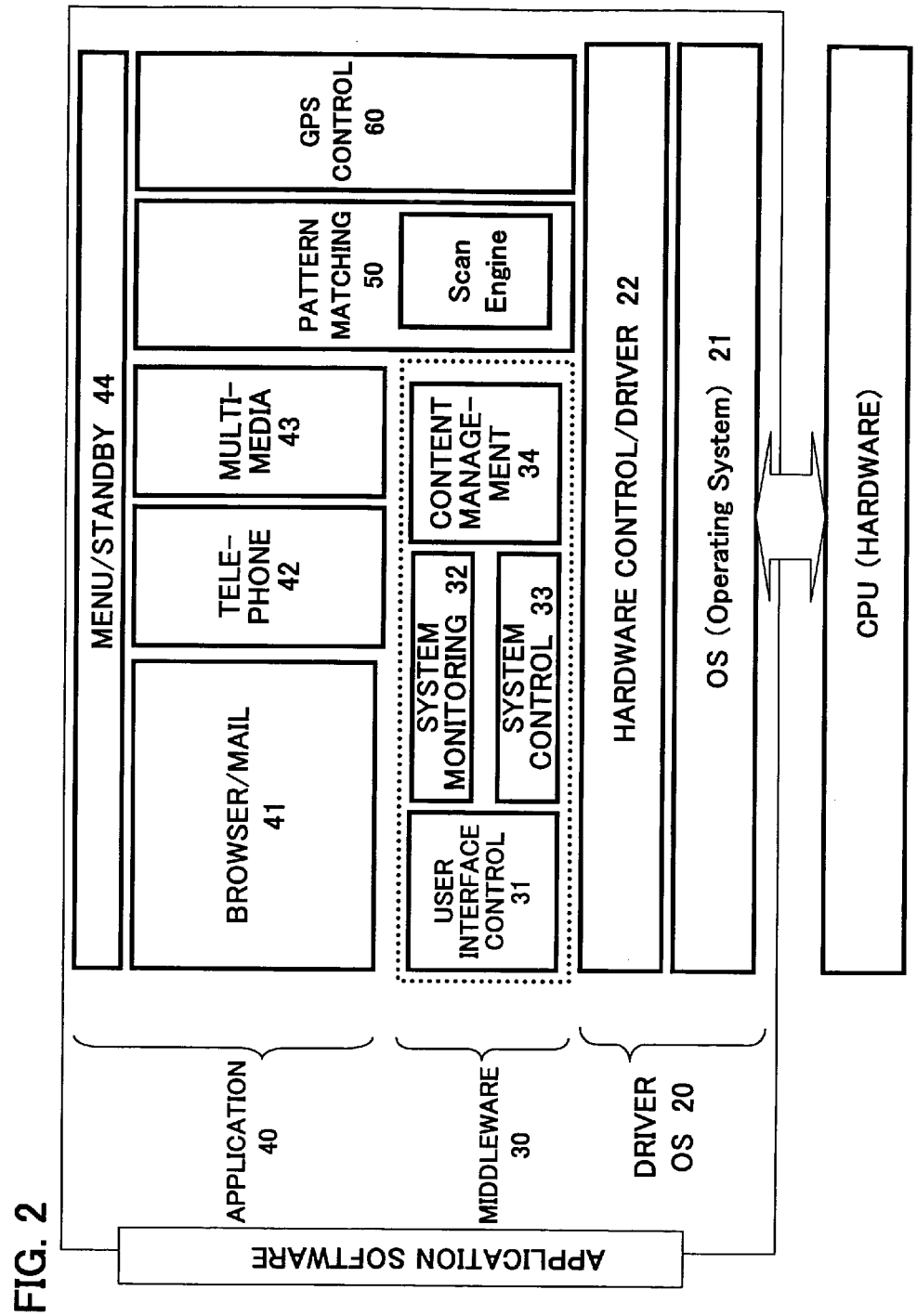
FIG. 2 shows an example of the software constitution that is incorporated in the mobile communication device of the embodiment of the present invention.

FIG. 2 shows an example of the software constitution that is incorporated in the mobile communication device of the embodiment of the present invention. A variety of functions are implemented and the software executed by the CPU has a hierarchical constitution and comprises an OS/driver layer 20, a middleware layer 30, and an application layer 40. The OS/driver layer 20 comprises an OS (operating system) 21 and a hardware control driver 22. The middleware layer 30 comprises a user interface control function 31, a system monitoring function 32, a system control function 33, a content management function 34, and so forth, and the application layer 40 comprises a browser/mail function 41, a call function 42, a multimedia (still images, moving images and so forth) processing function 43, and a menu/standby function 44.

Further, the pattern matching function 50 that is used in this embodiment is located in both the middleware layer 30 and application layer 40. Furthermore, the GPS function 60 is also located in both the middleware layer 30 and application layer 40.

Figure 3:
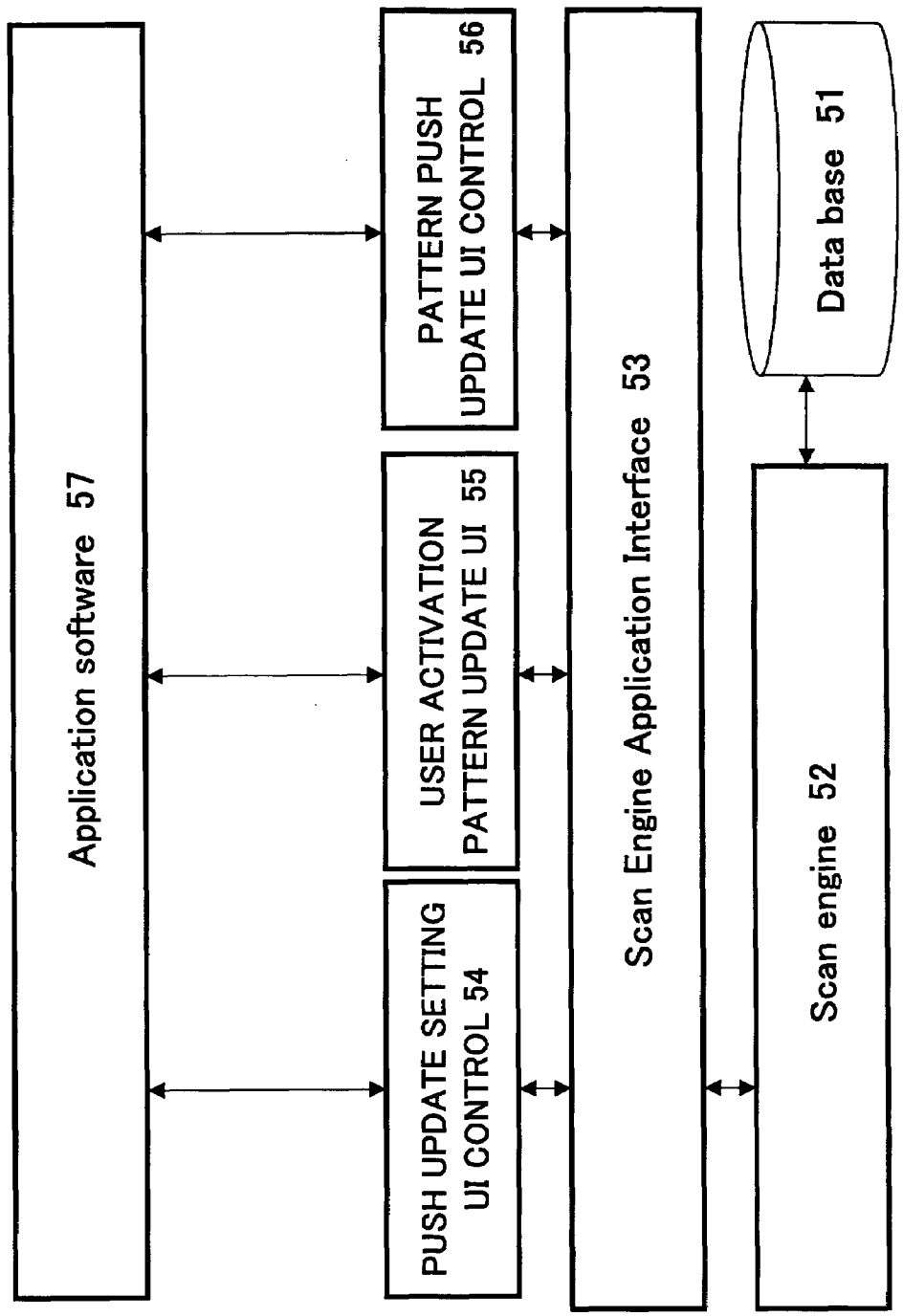
FIG. 3 shows an example of the software constitution of a pattern matching function 50.

FIG. 3 shows an example of the software constitution of the pattern matching function 50. The pattern matching function 50 comprises a database 51 for storing pattern matching data (described subsequently) for converting specified input information to information corresponding with the current position of the mobile communication device, and a scan engine 52 that searches the database 51, and comprises, via an interface 53, a push update setting UI control (User Interface) 54, a user activation pattern update UI control 55, and a pattern push update UI control 56. The push update setting UI control 54 is a UI control for updating the setting of the push update of the pattern matching data that is distributed by the server on the network. The user activation pattern update UI control 55 is UI control in a case where pattern-matching data is updated by means of a user operation. The pattern push update UI control 56 is a UI control in a case where pattern-matching data from a server on the network is push-updated in accordance with settings made by the push update setting UI control 54. Further, the respective UI controls 54, 55, and 56 operate the scan engine 52 via the interface 53 together with the application 57 and the pattern matching operation is implemented by referencing the database 51.

Figure 4:
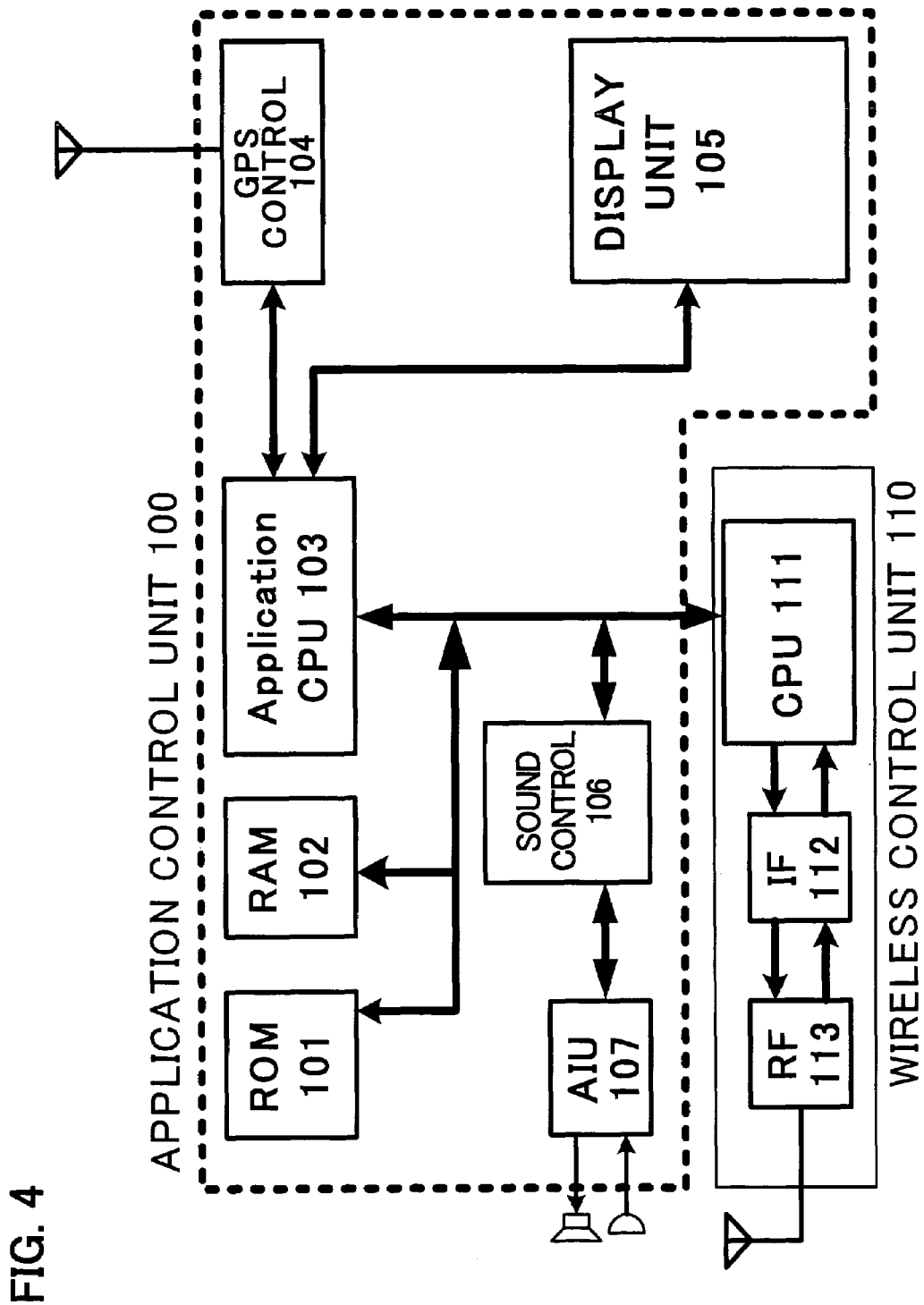
FIG. 4 shows an example of the hardware constitution of the mobile communication device of the embodiment of the present invention.

FIG. 4 shows an example of the hardware constitution of the mobile communication device of the embodiment of the present invention. The mobile communication device comprises an application control unit 100 and a wireless control unit 110. The application control unit 100 comprises a ROM 101 and RAM 102 for storing each of the types of software above and so forth, and the application CPU 103 executes various software. Further, the mobile communication device comprises a GPS function and comprises a GPS control unit 104 for this purpose. Further, a display unit 105 constituting an external interface, a noise control unit 106 for controlling noise signals that are inputted and outputted from a speaker or microphone for a call, and an interface (Audio Interface Unit: AIU) 107 with the speaker and microphone and so forth are also provided. In addition, the wireless control unit 110 comprises a CPU 111 that controls the transmission and receipt of wireless signals of various communications via the telephone, electronicmail, the Internet, and so forth, an interface 112, and a wireless signal transceiver unit (RF) 113.

FIG. 5 shows an example of pattern matching data for an emergency report electronicmail. Within Japan, the number 110, which is the emergency report telephone number for the police, is a well-known number. Therefore, in a case where an emergency report to the police is made by electronic mail, '110' (Japan only), for example, is set as the identification information for the report destination. Further, '119', which is a commonly known number in Japan is set as the identification information in a case where the fire brigade is the report destination. This identification information is associated with the pattern matching data and the mail addresses of the police and fire brigade having jurisdiction over the current position (area) of the mobile communication device are registered as conversion values. So too abroad, the mail addresses (conversion values) of the police and fire brigade of each country are registered for each country and in cases where the report destination is different for each area within each country, mail addresses are registered for each area. The report destinations are not limited to the police and fire brigade and may include other service providers. The mail addresses for each area corresponding with the identification information may also be registered.

The current position of the mobile communication device is area information on a base station that is communicating with the mobile communication device, for example. The mobile communication device communicates with the base station not only during a call but as occasion calls and is able to grasp the area containing the current position by acquiring base station identification information including area information on the base station and storing this information in internal memory (RAM). So too in a case where the mobile communication device moves and the base station of the communication destination has changed, the base station identification information is updated as occasion calls as a result of regular communications between the mobile communication device and base station, and the mobile communication device acquires base station identification information on the base station that is closest to the current position.

Although the current position of the mobile communication device is specified as a relatively narrow range centered on the base station by acquiring the base station identification information, because the emergency report mail address normally varies in units of the administrative divisions of Japan, position information with high pin-point accuracy is not required and the emergency report mail address corresponding with the current position of the mobile communication device can be extracted in accordance with area information contained in the base station identification information. Further, the country to which the current position of the mobile communication device belongs can be identified from the area information contained in the base station identification information. Naturally, the current position of the mobile communication device may be specified by using the GPS function of the mobile communication device and the mail address corresponding with the current position measured by the GPS may be registered in the pattern matching data.

Figure 6:
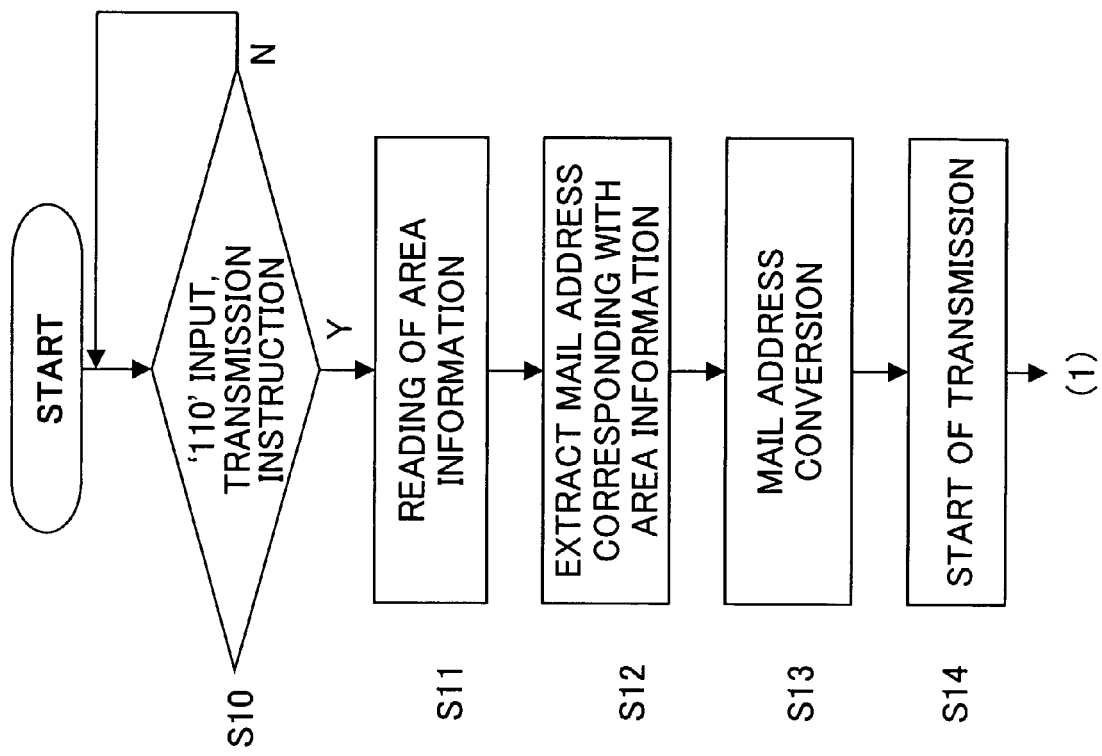
FIG. 6 is a flowchart showing the processing of an emergency report via electronic mail of the embodiment of the present invention.

FIG. 6 is a flowchart showing the processing of an emergency report via electronic mail of the embodiment of the present invention. The user activates the mail function for an emergency report to the police, inputs the main text, inputs '110' as the destination, and performs the transmission operation. Upon receipt of an instruction to transmit an electronic mail with the destination address '110' (S10), the mobile communication device reads area information stored in the internal memory of the mobile communication device (S11). The mobile communication device searches for pattern matching data on the basis of the acquired area information and extracts the mail address corresponding with the mail information (S12). The mobile communication device converts the destination address of the inputted electronic mail to the extracted mail address (S13) and starts the transmission processing of the electronic mail to the extracted mail address destination (S14).

FIG. 7 shows an example of pattern matching data for the emergency report telephone number. Similarly to an electronic mail case, within Japan, number 110, which is the emergency report telephone number for the police is a generally well-known number and is identification information for the police. Therefore, in cases where an emergency report is issued to the police over the telephone, '110', for example, is set as the telephone number of the report destination. Further, '119' is set in a case where the fire brigade is the report destination. The telephone numbers for the police and fire brigade of the country to which the current area of the mobile communication device belongs are registered associated with these telephone numbers in the pattern matching data. Further, in a case where the telephone number of the police or fire brigade are different for each area depending on the country, the telephone number is registered for each area of the country.

Furthermore, in the case of Japan, '119' is the emergency report number of both the fire brigade and ambulance. However, depending on the country, cases where the emergency report numbers for the fire brigade and ambulance are different may be assumed. Thus, in cases where the numbers of a plurality of report destinations are associated with one number in the pattern matching data, a screen for selecting any of a plurality of report destinations is displayed and a call request is made to the report destination selected by the screen operation. Similarly also to the electronic mail case, when mail addresses of a plurality of report destinations are associated with one mail address, a mail transmission is made to a report destination selected by means of a screen operation.

Figure 8:
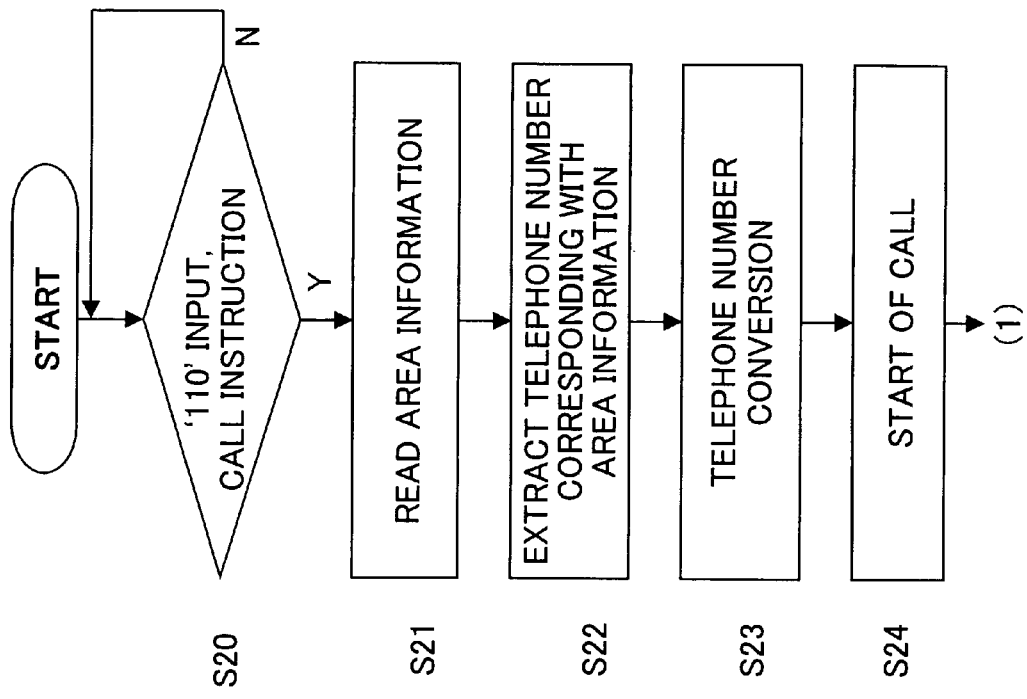
FIG. 8 is a flowchart showing the processing of a warning report via the telephone of the embodiment of the present invention.

FIG. 8 is a flowchart showing the processing of a warning report via the telephone of the embodiment of the present invention. The user inputs '110' to make an emergency report to the police and performs a call operation over the telephone. Upon receipt of a call request with the telephone number '110' (S20), the mobile communication device reads current area information that is stored in the internal memory of the mobile communication device (in this case, the current area information is domestic information contained in the base station identification information) (S21). The mobile communication device searches for pattern matching data on the basis of the acquired current area information (domestic information) and extracts the telephone number corresponding with the current area information (S22). The mobile communication device converts the inputted telephone number to the extracted telephone number (S23) and starts call processing by means of the telephone number thus extracted (S24).

In both the electronic mail and telephone cases, even when the communication address such as the electronic mail address or telephone number are different according to the current area of the mobile communication device for the same communication partner, it is possible to report to the report destination corresponding with the current position of the mobile communication device by means of the same input information (identification information) irrespective of the current area of the mobile communication device. Therefore, even in a case of a report demanding an emergency, there is no need to search for and input report destination information corresponding with the current position one at a time and reports can be made easily and as occasion calls.

Following the emergency report, it is necessary for the mobile communication device to communicate its own correct position to the report destination. There are cases where the user has not correctly grasped their own position, cases where there has been a misunderstanding, and in such cases, it is not possible to accurately communicate the user's (or mobile communication device's) position by means of the telephone or mail. As a result, the report destination such as the police uses the third party search function (position communication request) and acquires position information that is found by means of the GPS function of the mobile communication device that issued the emergency report.

Conventionally, upon receipt of the third-party search request from the report destination, the mobile communication device activates the GPS function and starts the positioning. However, because the positioning takes a relatively long time (about 30 seconds), while there is the concern that the communication of position information will be delayed, the positioning of the GPS function imposes a large load on the mobile communication device.

Therefore, in this embodiment, a mobile communication device with a built-in processor with a relatively high processing performance activates the GPS function, starts the positioning, and stores the acquired position information following emergency reporting or during emergency reporting. Thereafter, upon receipt of a position communication request such as a third party search request from the report destination, the mobile communication device sends back position information that is found and stored beforehand immediately. Further, a mobile communication device with a built-in processor with a relatively low processing performance activates the GPS function, starts the positioning, and communicates the position information thus found to the report destination following receipt of a third party search request from the report destination as is the case conventionally. A mobile communication device with a built-in processor with a relatively high processing performance has a relatively high processing performance that is sufficient to be able to perform positioning with a GPS function in parallel with processing to transmit a call or mail. The processing performance of the processor is determined with the operation speed of the processor serving as the reference, for example, and it is judged as a processor with a relatively high processing performance in the case of a processor at or above a predetermined operational speed and it is judged as a processor with a relatively low processing performance in the case of a processor with a speed that is less than a predetermined operational speed.

Figure 9:
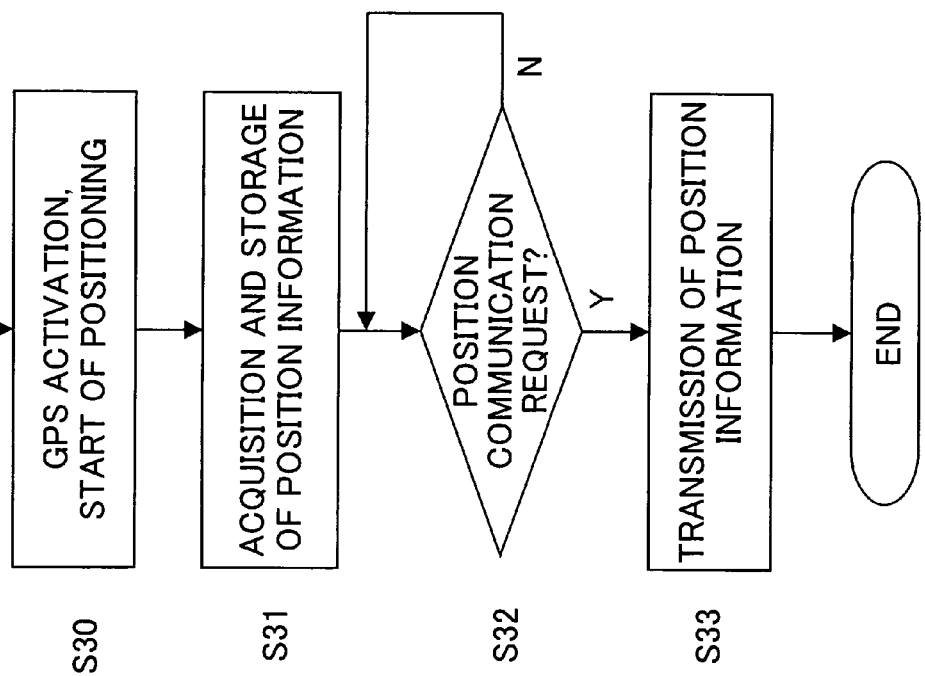
FIG. 9 is a flowchart of the position information communication processing of a mobile communication device with a high processing performance.

FIG. 9 is a flowchart of the position information communication processing of a mobile communication device with a high processing performance. Upon starting an operation to transmit an electronic mail to an emergency report destination (S14 in FIG. 6) or upon starting an operation to make a call to the emergency report destination (S24 in FIG. 8), the mobile communication device activates the GPS function and starts positioning at the same time as performing mail transmission processing or call processing (S30). That is, positioning processing is performed in parallel with this processing without waiting for electronic mail transmission or termination of the call. The mobile communication device has a built-in processor with high processing performance and, therefore, even when positioning processing with a large load is performed, a state where other processing such as electronic mail transmission or a call are obstructed does not arise.

When position information is acquired as a result of the positioning processing, this position information is stored in the internal memory (S31). Further, when a position communication request such as a third party search request or the like is received from an emergency report destination (S32), position information that is stored in step S31 is read and communicated to the emergency report destination (S33).

Figure 10:
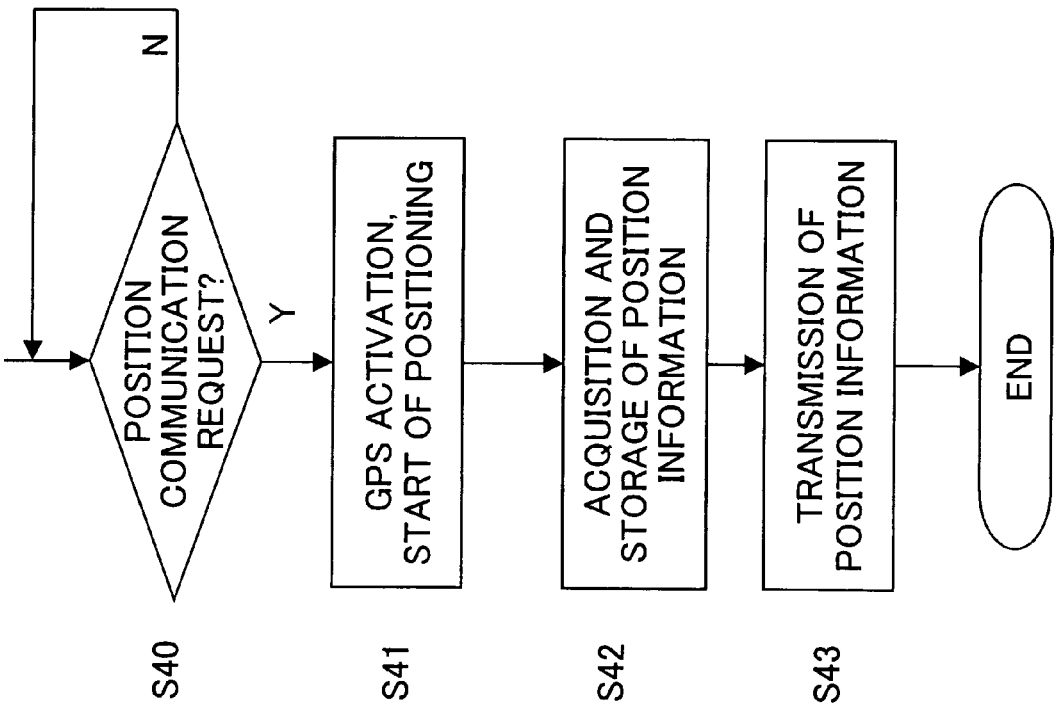
FIG. 10 is a flowchart of position information communication processing of a mobile communication device with a low processing performance.

FIG. 10 is a flowchart of position information communication processing of a mobile communication device with a low processing performance. When an operation to transmit an electronic mail to the emergency report destination is started (S14 in FIG. 6) or an operation to make a call to the emergency report destination is started (S24 in FIG. 8), as usual, the mobile communication device performs mail transmission processing or call processing but, unlike the case in FIG. 9, does not activate the GPS function at this time. The mobile communication device awaits a position communication request from the emergency report destination and, upon receiving same (S40), activates the GPS function and starts positioning (S41). This is because the processing performance of the processor that is built into the mobile communication device is low and therefore, when positioning processing is started during transmission of mail or during a call, there is the possibility of a hindrance to the mail transmission processing or call processing.

When position information is acquired as a result of positioning processing (S42), the position information is communicated to the emergency report destination (S43).

Figure 11:
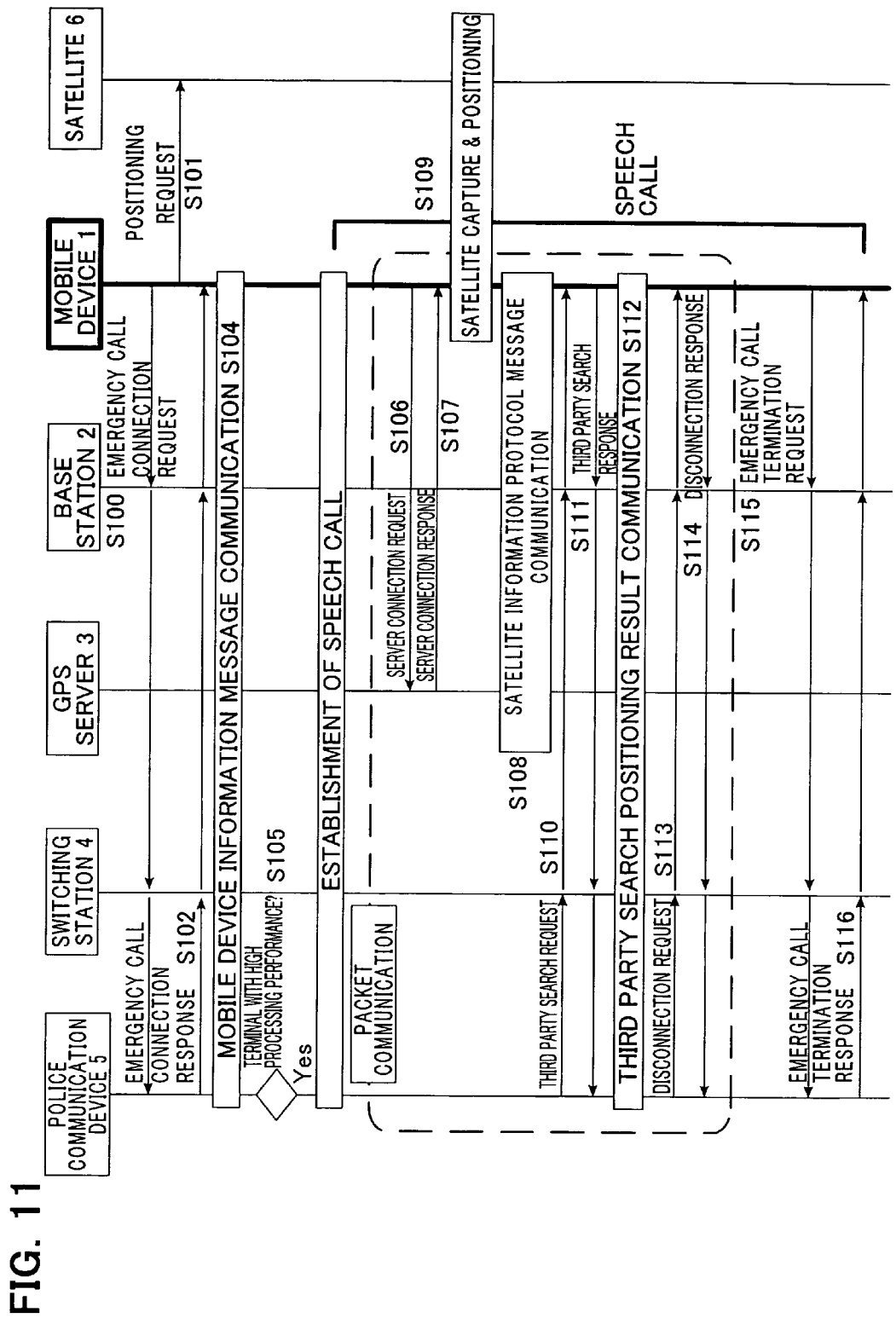
FIG. 11 is a position search processing flowchart for a mobile communication device with a high processing performance and a communication device of the emergency report destination.

FIG. 11 is a position search processing flowchart for a mobile communication device with a high processing performance and a communication device of the emergency report destination. Further, FIG. 11 shows an example of processing in a case of an emergency report by telephone. Upon transmitting an emergency call connection request to the police, which is the emergency report destination (S100), the mobile device 1 activates the GPS function and makes a positioning request to the GPS satellite 6 (S101). More specifically, the GPS satellite searches for a GPS satellite that can be captured.

Upon receipt of an emergency connection request via the base station 2 on the side of the mobile device 1 and the switching station 4 on the police side, a police communication device 5 sends back an emergency call connection response on the same route in order to establish a speech call (S102). Further, when transmitting an emergency call connection request to the base station 2, the mobile device 1 communicates mobile device information (model information, for example) that makes it possible to judge the processing performance of the built-in processor to the base station 2 by means of a mobile device information message communication (S104). The processing performance of the mobile device can be discriminated from the model information. Further, the police communication device 5 uses a mobile device information message communication (S104) to acquire mobile device information that is communicated to the base station 2.

The police communication device 5 judges whether the mobile device is a mobile device with a high processing performance on the basis of the acquired mobile device information and, in cases where the processing performance is judged to be high (S105), the processing progresses to the following processing. Further, a case where the processing performance is judged to be low is described in FIG. 12 below.

While the speech call is established and the user of the mobile device 1 and the operator of the police communication device 5 are calling, the mobile device 1 transmits a server connection request to the GPS server 3 (SlO6) and a connection between the mobile device 1 and GPS server 3 is established as a result of the GPS server 3 sending back a server connection response to the mobile device 1 (S107), whereby a positioning information message communication (S108) is possible. Further, the mobile device 1 captures the GPS satellite 6 and acquires positioning information relating to the position (S109). Upon acquiring the positioning information from the GPS satellite 6, the mobile device 1 uses a positioning information message communications (S108) to communicate positioning information to the GPS server 3 and the GPS server 3 requests position information on the mobile device 1 based on the positioning information and communicates the position information to the mobile device 1. The mobile device 1 stores the received position information in internal memory.

On the other hand, when it is judged that the processing performance of the mobile device 1 is high, the police communication device 5 transmits a third party search request to the mobile device 1 during a speech call (S110). The mobile device 1 sends back a third party search response for the third party search request (S111) and communicates the position information acquired from the GPS server 3 to the police communication device 5 as a third party search positioning result (S112).

Upon receipt of the positioning result of the third party search function, the police communication device 5 transmits the disconnection request to the mobile device 1 (S113) and third party search processing ends as a result of the mobile device 1 sending back a disconnection response byway of response (S114).

Further, an emergency call termination request is transmitted by the mobile device 1 (S115) and the speech call ends as a result of an emergency call termination response being sent back by the police communication device 5 (S116).

Thus, the mobile device acquires GPS position information and the processing until this GPS position information is communicated to the police communication device 5 by means of a third party search request is performed while the speech call is made. Therefore, the police are able to quickly learn of the position of the mobile device 1 (that is, that of the user) and are able to know the accurate position of the mobile device 1 during a speech call. Suitable information or instructions or the like can therefore be supplied.

Further, in cases where an emergency report is made by electronic mail, an electronic mail for an emergency report is transmitted instead of the emergency call connection request. However, so too in this case, the fact that positioning is started prior to receipt of a third party search request from the police without termination of electronic mail transmission and that position information is communicated in accordance with a third party search request from the police is similar to a case of the speech call. Further, the processing of a third party search request and processing with the GPS server are similar to those of a speech call case. Therefore, a detailed description is omitted.

Figure 12:
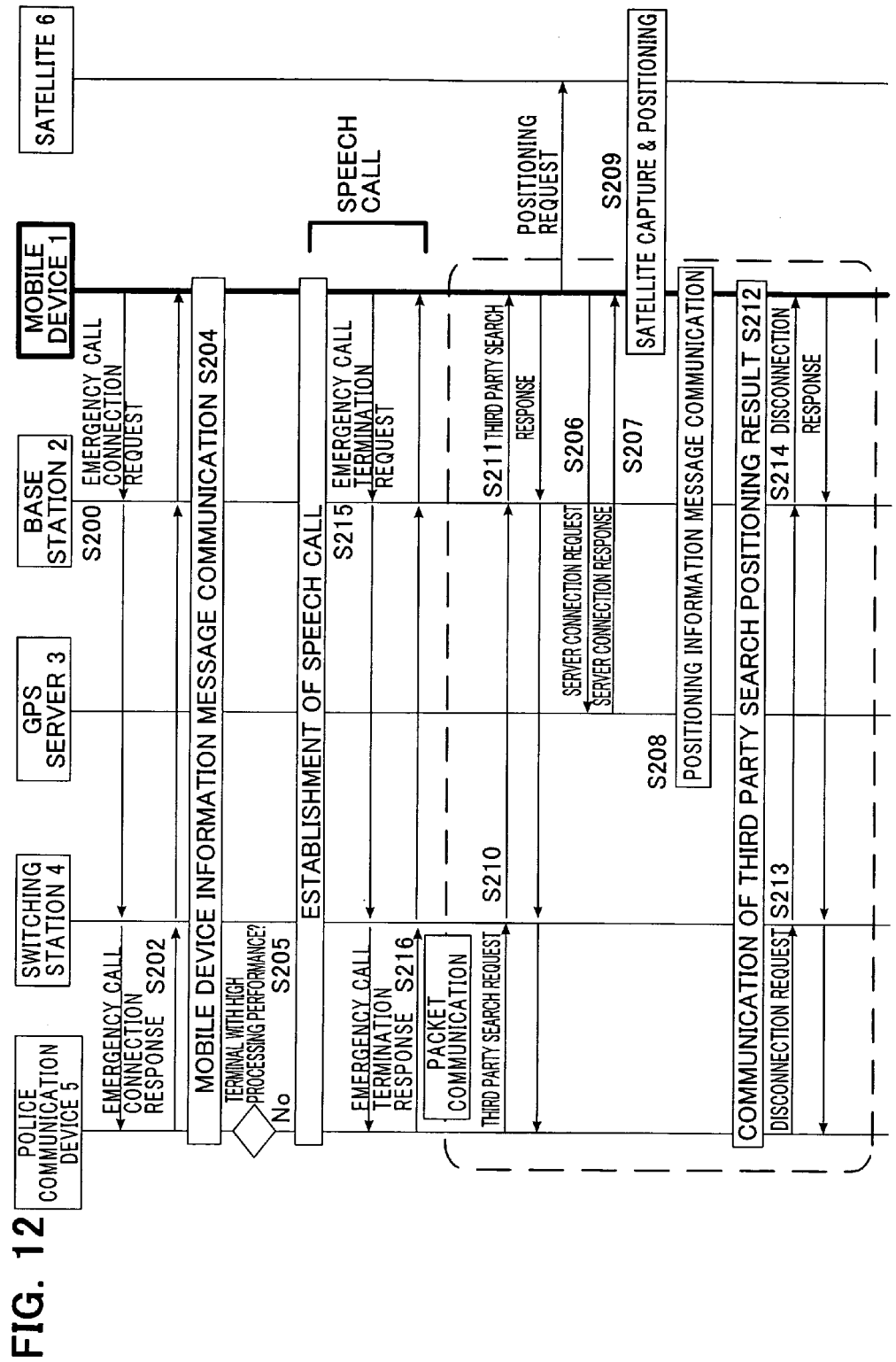
FIG. 12 is a position search processing flowchart for a mobile communication device with a low processing performance and a communication device of the emergency report destination.

FIG. 12 is a position search processing flowchart for a mobile communication device with a low processing performance and a communication device of the emergency report destination. Similarly to FIG. 11, FIG. 12 also shows a processing example for a telephone emergency report case. In a case where the processing performance of the mobile device is low, positioning is started and a third party search request is issued after the speech call has ended. This is described more specifically below.

The mobile device 1 transmits an emergency call connection request to the police, which is the emergency report destination (S200) and, upon receipt of the emergency call connection request via the police switching station 4 in addition to the base station 2 on the side of the mobile device 1, the police communication device 5 sends back an emergency call connection response for the purpose of establishing a speech call (S202). Further, the mobile device 1 communicates mobile device information (model information, for example) that makes it possible to discriminate the processing performance of the mobile device 1 to the base station 2 by means of mobile device information message communications (S204). Further, the police communication device 5 uses mobile device information message communications (S204) to acquire mobile device information that is communicated to the base station 2.

The police communication device 5 judges whether the mobile device 1 is a mobile device 1 with a high processing performance on the basis of the acquired mobile device information and proceeds with the following processing in a case where it is judged that the processing performance is low (S205). The case where it is judged that the processing performance is low was described in FIG. 11 above.

A speech call is established and the user of the mobile device 1 and operator of the police communication device 5 make a call, whereby an emergency call termination request is transmitted by the mobile device 1 (S215) and an emergency call termination response is sent back by the police communication device 5 (S216), whereby the speech call ends.

When the speech call ends, the police communication device 5 transmits a third party search request to the mobile device 1 (S210). The mobile device 1 sends back a third party search response to the third party search request (S211) and sends a server connection request to the GPS server 3 (S206). A connection between the mobile device 1 and GPS server 3 is established as a result of the GPS server 3 sending back a server connection response to the server connection request (S207), whereby a position information message communication (S208) is possible. Further, the mobile device 1 captures the GPS satellite 6 and acquires position information relating to the position from the GPS satellite 6 (S209). Upon acquiring position information from the GPS satellite 6, the mobile device 1 uses position information message communications (S208) to communicate the position information to the GPS server 3 and the GPS server 3 finds position information on the mobile device 1 based on the position information and communicates the position information to the mobile device 1.

The mobile device 1 communicates the position information acquired from the GPS server 3 to the police communication device 5 as a third party search position result (S212).

Upon receipt of the positioning result produced by the third party search function, the police communication device 5 transmits a disconnection request to the mobile device 1 (S213) and third party search processing ends as a result of the mobile device 1 sending back a disconnection response to the disconnection request (S214).

Although an example of an emergency report by telephone or electronic mail or the like to an emergency report destination such as the police or fire brigade in the above embodiment, the present invention is not limited to an emergency report to an emergency report destination and can be applied to a case where the communication address such as the telephone number or electronic mail address or the like of the same report destination is different depending on the area. Furthermore, the police, fire brigade and ambulance and so forth are a collective body of organizations whose jurisdiction is divided for each prefecture and are separate organizations for each country. However, when a telephone number that is generally well known exists as a report destination for the same object and application, this constitutes the same report destination.

What is claimed is:

1. A position search device that, based on a report to a predetermined report destination from a mobile communication device that locates a current position by GPS positioning and searches for the current position of the mobile communication device from the report destination, comprising:
   a communication device of the report destination acquiring mobile device information identifying the processing performance of the mobile communication device, and transmitting a position communication request to the mobile communication device while communicating with the mobile communication device when it is judged that the processing performance of the mobile communication device is high, on the basis of the mobile device information, and transmitting a position communication request to the mobile communication device following the end of communications with the mobile communication device when it is judged that the processing performance of the mobile communication device is low; and
   the mobile communication device communicating the current position, that is obtained as a result of the GPS positioning, to the communication device of the report destination on the basis of the receipt of the position communication request.

2. The position search device according to claim 1, wherein:
   a mobile communication device with a high processing performance starts GPS positioning while communicating with the communication device of the report destination; and
   a mobile communication device with a low processing performance starts GPS positioning on the basis of receipt of the position communication request.

3. The position search device according to claim 1, wherein the processing performance of the mobile communication device is judged from the operating speed of a processor built in the mobile communication device.

4. The position search device according to claim 1, wherein:
   the mobile communication device comprises a storing unit which stores identification information for a predetermined report destination and a communication address for each area for the report destination; and
   the mobile communication device detects the area containing the current position in response to the input of the identification information of the report destination, extracts the communication address of the report destination corresponding with the detected area from the storage unit, and communicates with the communication device of the report destination by using the extracted communication address.

5. The position search device according to claim 4, wherein the communication address is a telephone number or an electronic mail address.

6. A position search method, based on a report to a predetermined report destination from a mobile communication device, that locates a current position using GPS positioning and searches for a current position of the mobile communication device from the report destination, comprising:
   acquiring mobile device information identifying processing performance of the mobile communication device;
   transmitting a position communication request to the mobile communication device while communicating with the mobile communication device when it is judged that the processing performance of the mobile communication device is high, on the basis of the mobile device information;
   transmitting a position communication request to the mobile communication device following the end of communications with the mobile communication device when it is judged that the processing performance of the mobile communication device is low; and
   communicating the current position, that is obtained as a result of the GPS positioning, to the communication device of the report destination on the basis of the receipt of the position communication request.

7. The position search method according to claim 6, wherein:
   starting GPA positioning by a mobile communication device with a high processing performance while communicating with the communication device of the report destination; and
   starting GPS positioning by a mobile communication device with a low processing performance on the basis of receipt of the position communication request.

8. The position search method according to claim 6, wherein the processing performance of the mobile communication device is judged from the operating speed of a processor in the mobile communication device.

9. The position search method according to claim 6, wherein:
   storing identification information for a predetermined report destination and a communication address for each area for the report destination by the mobile communication device storing identification information for a predetermined report destination and a communication address for each area for the report destination; and
   the detecting, by mobile communication device, the area containing the current position in response to the input of the identification information of the report destination, extracting the communication address of the report destination corresponding with the detected area from the storage unit, and, using the extracted communication address, communicating with the communication device of the report destination.

10. The position search method according to claim 6, wherein the communication address is a telephone number or an electronic mail address.

* * * * *

UNITED STATES PATENT AND TRADEMARK OFFICE
CERTIFICATE OF CORRECTION

PATENT NO. : 7,486,947 B2 Page 1 of 1
APPLICATION NO. : 11/166155
DATED : February 3, 2009
INVENTOR(S) : Hiroyuki Katsumata et al.

It is certified that error appears in the above-identified patent and that said Letters Patent is hereby corrected as shown below:

Column 14, Line 30, change "GPA" to --GPS--.

Signed and Sealed this

Twenty-sixth Day of January, 2010

David J. Kappos
*Director of the United States Patent and Trademark Office*